United States Patent [19]

Owen

[11] Patent Number: 5,583,308
[45] Date of Patent: Dec. 10, 1996

[54] MUSICAL EFFECTS APPARATUS AND TONE CONTROL PROCESS FOR A MUSICAL INSTRUMENT

[75] Inventor: Randall L. Owen, Valencia, Calif.

[73] Assignee: Maestromedia, Inc., Los Angeles, Calif.

[21] Appl. No.: 200,006

[22] Filed: Feb. 22, 1994

Related U.S. Application Data

[63] Continuation-in-part of Ser. No. 136,651, Oct. 14, 1993, abandoned.

[51] Int. Cl.$^6$ .............................. G10H 7/00; H02M 5/00
[52] U.S. Cl. .............................. 84/619; 84/626; 84/631; 84/657; 84/662; 84/664
[58] Field of Search .......................... 84/619, 626, 630, 84/631, 657, 662, 664, DIG. 1, DIG 14, DIG. 18

[56] References Cited

U.S. PATENT DOCUMENTS

| | | | |
|---|---|---|---|
| 5,159,141 | 10/1992 | Iba | 84/637 |
| 5,194,682 | 3/1993 | Okamura et al. | 84/626 |
| 5,225,618 | 7/1993 | Wadhams | 84/602 |
| 5,270,475 | 12/1993 | Weiss et al. | 84/603 |
| 5,294,745 | 3/1994 | Yamauchi et al. | 84/601 |
| 5,296,643 | 3/1994 | Kuo et al. | 84/610 |
| 5,313,011 | 5/1994 | Koguchi | 84/609 |
| 5,410,603 | 4/1995 | Ishiguro et al. | 84/626 |

*Primary Examiner*—William M. Shoop, Jr.
*Assistant Examiner*—Jeffrey W. Donels
*Attorney, Agent, or Firm*—Lyon & Lyon

[57] ABSTRACT

In an automated system for learning to play a musical instrument, music data and tone control data for a musical composition of an exemplary musical instrument is stored in machine readable form. An audio signal generated by a musical instrument being played, corresponding to the exemplary musical instrument, is inputted through a musical effects apparatus wherein the musical tone of the musical instrument being played is mixed with the stored music data. The musical effects apparatus is utilized, under digital control, to match the musical tone of the musical instrument being played with that of the exemplary musical instrument. More particularly, the music data and tone control data of the musical composition are stored on a conventional CD-ROM. The tone control data is utilized to create control parameters which can be used to control one or more electronic effects devices in an automated fashion. The stored parameters include control data utilized to set the values of one or more digitally-controlled programmable resistor networks capable of conditioning the input audio signal under digital control, without first converting the conditioned audio signal to a digital signal.

34 Claims, 5 Drawing Sheets

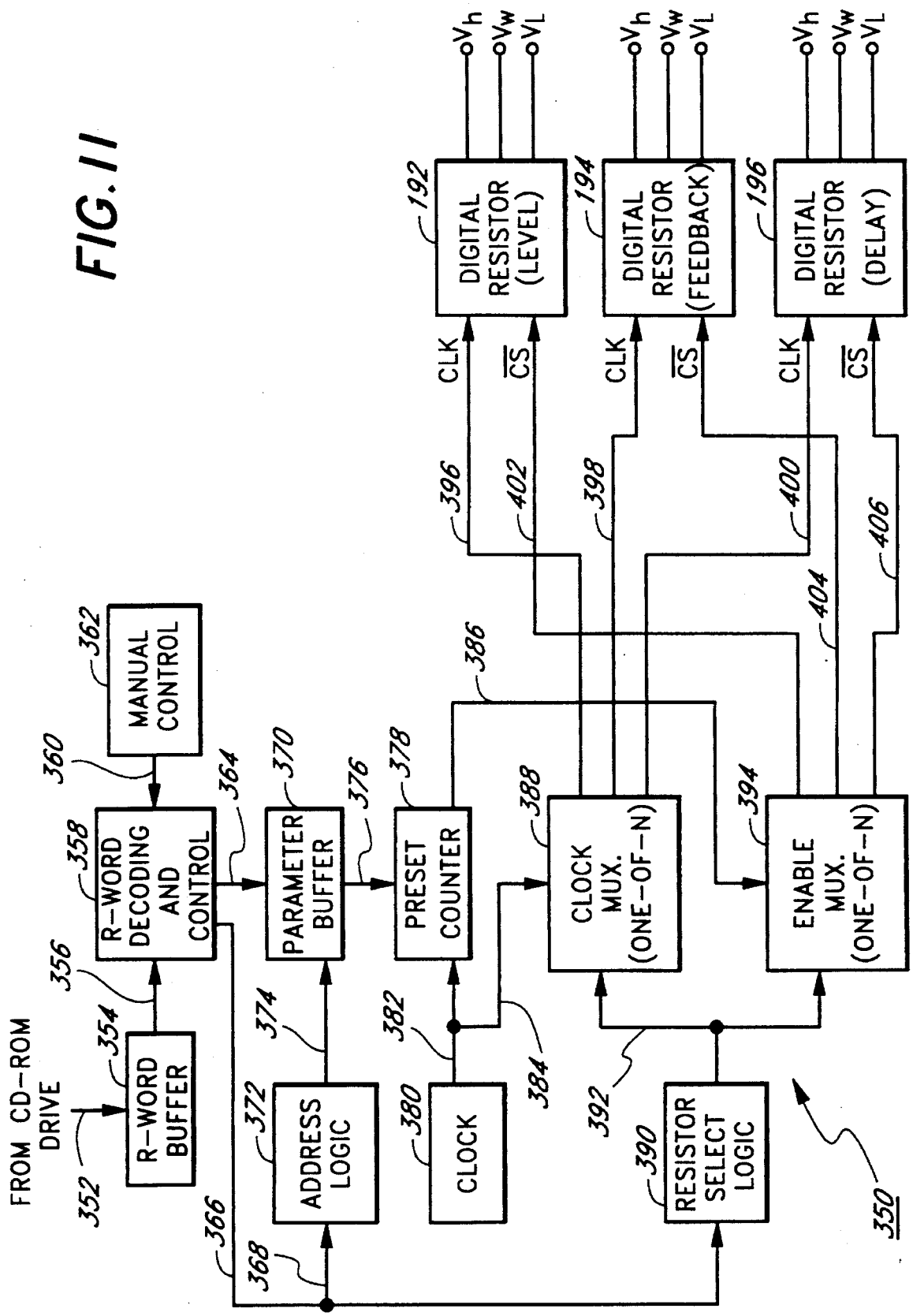

5,583,308

MUSICAL EFFECTS APPARATUS AND TONE CONTROL PROCESS FOR A MUSICAL INSTRUMENT

This is a continuation-in-part of U.S. patent application Ser. No. 08/136,651, filed Oct. 14, 1993 and entitled INTERACTIVE MUSICAL INSTRUMENT INSTRUCTION SYSTEM, now abandoned.

BACKGROUND OF THE INVENTION

The present invention relates to electronic effects for musical instruments. More particularly the present invention relates to a method and apparatus for matching the tone of a musical instrument being played with the recorded tone of a like instrument.

Effects devices for modifying the tone of a musical instrument are known. Examples of such devices include delay devices, distortion devices and reverberation devices. These devices are typically connected either to the output of the musical instrument or its amplifier, and are used to modify the tone in order to make it more pleasing and interesting. These devices typically include one or more manually operable controls for adjusting and controlling various parameters associated with each device. A user adjusts each of these controls to achieve the particular sound or musical tone desired.

When learning to play an instrument in the particular style of a specific musician or group, a student will often desire to match the tone of his or her musical instrument with that of the music being learned. This typically involves trial and error adjustment of the individual manual controls for one or more tone modification devices until the desired tone is achieved. This difficult and time-consuming process makes it almost impossible for the student to match the tone of his instrument to that which he is attempting to learn.

As set forth in co-pending U.S. patent application Ser. No. 08/136,651, filed Oct. 14, 1993 and entitled INTERACTIVE MUSICAL INSTRUMENT INSTRUCTION SYSTEM, the contents of which are incorporated herein, a musical instrument instruction system has been developed in which instructional material is presented in a way that is both educational and entertaining, thus encouraging the student to practice and experiment with new playing techniques and styles. The musical instrument instruction system includes the steps of providing both audio and video instructional materials on an electronic storage medium, and utilizing a computer to select instructional materials to be presented from those stored on the electronic storage medium. Delivery parameters are selected by the student to provide a desired playback of the selected instructional material, and then a selected musical piece is played back in accordance with the selected delivery parameters.

In a preferred form, both audio and video instructional materials are provided on a CD-ROM electronic storage medium. The computer is utilized to access the data on the CD-ROM and, initially, the student selects either a song to be played or a musical drill to be practiced.

In selecting the delivery parameters to customize the playback of the selected instructional material, the student selects whether or not to display an expert musician playing a selected musical piece in a video display concurrently with audio output of the musical piece by the computer. The student is further provided the opportunity to control the tempo of the musical out generated by the computer without affecting the pitch thereof. To accomplish this, the computer utilizes a sample-and-hold circuit which receives input from a waveform frame buffer and a hold time buffer, to control the playback tempo. This efficiently provides the desired musical output while minimizing the memory storage requirements to the computer itself.

When playing back the selected musical piece in accordance with the selected delivery parameters, the musical notation or tablature of the musical piece is displayed. Moreover, the particular note or chord of the notation or tablature being played is highlighted for the relative duration of the note or chord. The student is also provided the opportunity to select whether or not a video display of the manner of playing a musical instrument will be shown with the displayed notation or tablature.

The musical instrument instruction system combines musical output of a practice instrument with musical output generated by the computer corresponding to the selected instructional material. In this regard, the process for learning to play a musical instrument includes the steps of mixing musical output of the practice instrument with musical output of the computer. Background music may also be provided by the computer, and the student is able to control the mix of background music relative to foreground music, as well as control the mixture of musical output of the practice instrument relative to musical output of the computer.

In order to accomplish this, an effects device is needed which is programmable and which allows a student to automatically match the tone of his or her musical instrument with that of the recorded music. Such a device should provide for the professional augmentation of the output of the student's instrument, so that the ultimate musical output from the speakers will be a faithful emulation of the sound that the musician or group achieves in concert or on recordings. The present invention fulfills these needs and provides other related advantages.

SUMMARY OF THE INVENTION

The present invention provides for the automatic storage and recall of one or more control parameters which can be used to control one or more electronic effects devices in an automated fashion. These stored parameters include control data which are used to set the values of one or more digitally-controlled resistor networks used with each of the electronic effects devices. This allows a computer or other automated system to directly control the operation of the electronic effects devices so that the musical tone of an instrument being played is automatically matched to the prerecorded sounds of a similar musical instrument.

In a preferred embodiment, the control parameters are stored in the subcode region of a conventional CD-ROM. More particularly, the parameters are stored in the unused bits labeled R through W of the subcode region. Since a standard CD-ROM contains many such unused bits, there is ample room on the CD-ROM to store many such control parameters. In fact, each parameter can be automatically changed as often as desired; typically, the effects will be automatically changed at the beginning of each song or musical passage.

For example, in an automated system for learning to play a musical instrument, control parameters can be stored corresponding to each song or musical passage that is to be learned. Whenever that song or musical passage is accessed, the corresponding control parameters can be automatically accessed, decoded, and sent to the appropriate digital control devices which control a particular electronic effect device. This spares the student of having to manually adjust the controls of each musical effect in an attempt to match the tone of his instrument with that of the instrument being learned.

More particularly, a preferred apparatus for conditioning the musical tone of a musical instrument being played comprises means for storing music data and tone control data for a musical composition of an exemplary musical instrument in machine readable form, means for conditioning the musical tone of the musical instrument being played, and means for controlling the conditioning means using the tone control data. In this apparatus, the exemplary musical instrument corresponds to the musical instrument being played. Further, the conditioning means includes means for mixing the musical tone of the musical instrument being played with the music data or the exemplary musical instrument. The controlling means utilizes the tone control data so that the musical tone of the musical instrument being played matches the musical composition of the exemplary musical instrument.

The data storing means comprises a compact disk having a data field and a subcode field. The music data is stored in the compact disk data field, and the tone control data is stored in the compact disk subcode field.

The conditioning means comprises one or more analog musical effects devices for conditioning the musical tone of the musical instrument being played in a predetermined manner. The musical effects devices may include a distortion device for adding distortion to the musical tone of the musical instrument being played, a stereo chorus device for generating stereo musical tones from the musical tone of the musical instrument being played, and one or more delay devices for delaying the musical tone of the musical instrument being played by a predetermined amount.

The controlling means comprises a digital signal processing and control device for generating one or more control signals from the tone control data. These control signals directly control the analog musical effects devices. Such analog musical effects devices further comprise one or more digitally programmable control networks which provide digital control of the analog musical effects devices. More specifically, the digitally programmable control networks comprise a programmable resistor network having a plurality of resistors associated with a digitally actuated switching array, and means for selecting an appropriate combination of the plurality of resistors in accordance with input control signals. The controlling means further comprises a control processor and an address/data bus, wherein the control processor generates one or more digital control parameters from the tone control data and the address/data bus transfers each of the digital control parameters to the digitally programmable control networks.

Additional control parameters can be stored which allow for the automatic interconnection of the electronic effects devices. This allows the interconnections to be reconfigured in order to further change the tone of the musical instrument being played. In this case, the parameters are used to control digital switches instead of digital control devices, otherwise the storage and access would be identical to that described above.

In accordance with a preferred process for utilizing a computer to control an external device, the process comprises the steps of storing one or more control parameters for controlling the external device in a subcode field of a compact disk, reading the stored control parameters from the compact disk subcode field, creating an electronic signal in accordance with the control parameters, and transferring the electronic signal to the external device to effect the desired control thereof. One or more unused bits of the subcode field may be utilized for storing the control parameters. In this regard, the control parameters are stored in one or more ninety-eight-bit words formed from the subcode fields of ninety-eight consecutive compact disk data frames. The ninety-eight-bit words may be parsed into distinct control parameter storage fields.

When the process is utilized to control the tone of a selected musical instrument, the storing step includes the step of storing a musical composition comprising music data and tone control data corresponding to the selected musical instrument on the compact disk. The process further comprises the step of inputting a first audio signal from the selected musical instrument into a musical effects device. The reading, creating and transferring steps result in the generation of a second audio signal from the stored musical composition, which is input into the musical effects device. The first audio signal is conditioned using the musical effects device so that its tone matches the tone of the stored musical composition.

During the conditioning step one or more control signals are generated from the tone control data. The control signals control the musical effects device which, preferably, comprises an analog musical effects device subject to digital control. More specifically, the musical effects device comprises a programmable resistor network having a plurality of resistors associated with a digitally actuated switching array. Signals created from the stored control parameters directly control the digitally actuated switching array to select one or more of the plurality of resistors to provide the desired conditioning effects upon the first audio signal.

Within the musical effects device a process is provided for conditioning an analog signal under digital control. This process comprises the steps of splitting the analog signal so that it follows two distinct signal paths, directing the audio signal carried on a first of the signal paths to an analog effects device, converting the analog signal carried on a second one of the signal paths to a digital signal, utilizing the digital signal to analyze the analog signal and develop control parameters for the analog signal, and digitally controlling the analog effects device utilizing one or more digitally programmable control networks, to effect the desired conditioning of the analog signal through the analog effects device.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 11 is a functional block diagram which illustrates how the control parameters are decoded and used to set the values of programmable resistors;

DETAILED DESCRIPTION OF THE PREFERRED EMBODIMENT

Figure 1:
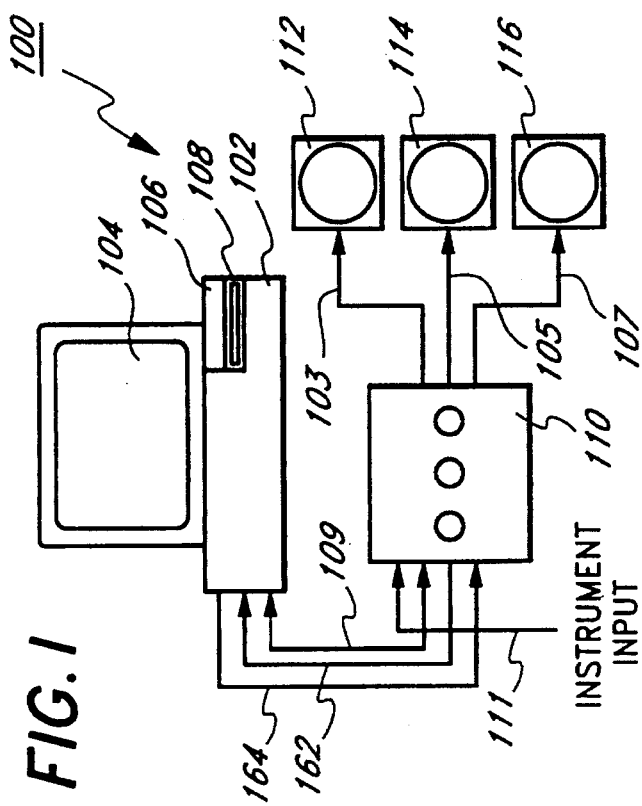
FIG. 1 is a functional block diagram of a musical effects apparatus and speakers connected to a computer system.

Referring to FIG. 1, an embodiment or a system 100 for controlling the tone of a musical instrument in an automated fashion is shown. System 100 includes a computer system 102 having a display 104, a disk drive 106, and a CD-ROM drive 108. A musical effects apparatus 110 is connected to computer system 102 via a signal path 109. Speakers 112 to 116 are respectively connected to effects apparatus 110 via signal paths 103 through 107. A musical instrument. (not shown), is connected to the input of effects apparatus 110 via a signal path 111.

Figure 2:
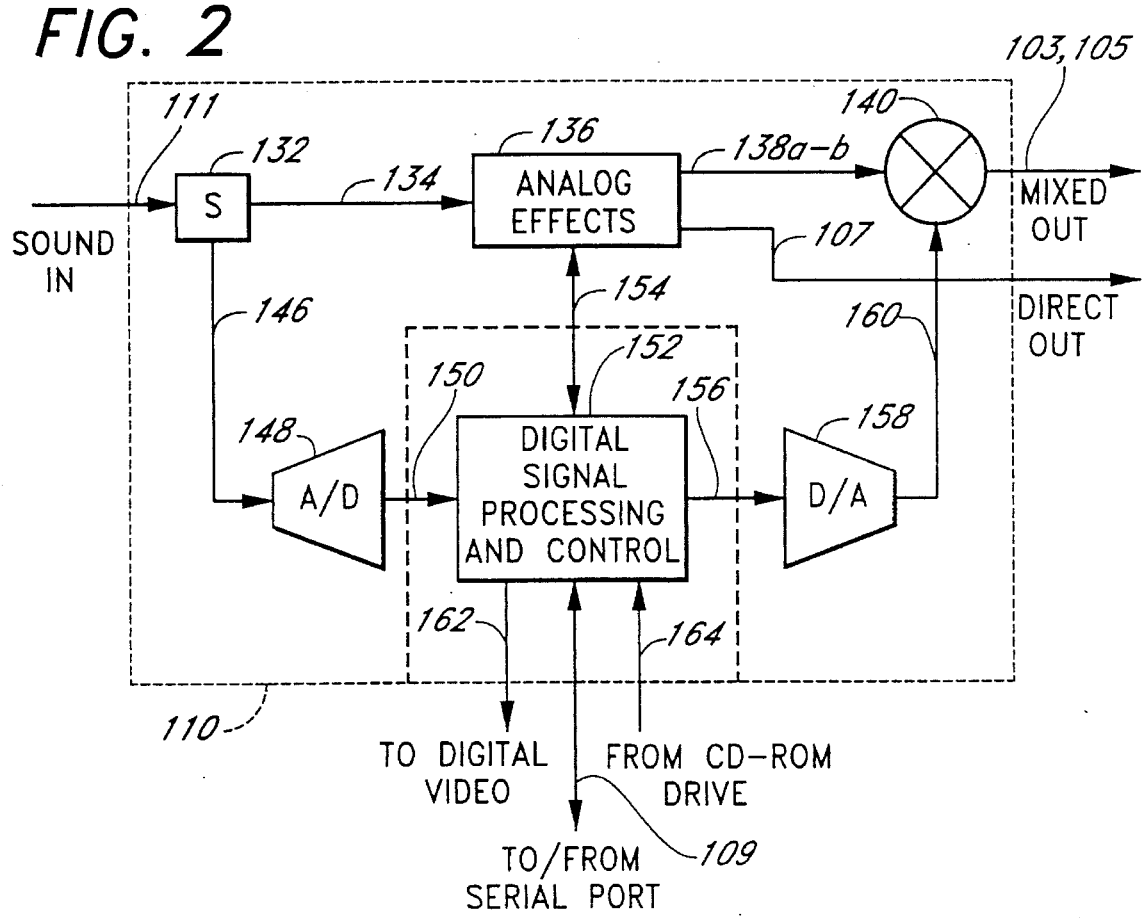
FIG. 2 is a more detailed functional block diagram of a musical effects apparatus constructed in accordance with the present invention.

Continuing with FIG. 2, a more detailed block diagram of musical effects apparatus 110 is now described. Signal path 111 routes a signal from a musical instrument to a splitter 132 which in turn routes the signal to an analog effects module 136 via a signal path 134, and to an analog-to-digital converter 148 via a signal path 146. The two stereo outputs of analog effects module 136 are routed to a stereo mixer 140 via respective signal paths 138a and 138b, and a third non-stereo output is routed directly out via a signal path 107. The digitized output of the analog-to-digital converter 148 is routed to a digital signal processing and control module 152 via a signal path 150.

Continuing with FIG. 2, the digitized musical instrument signal is routed to computer system 102 via a signal path 162 for processing and display. In addition, the musical output from CD-ROM drive 108 is routed to digital signal processing and control module 152 via a signal path 164. Finally, control parameters (to be discussed below), are routed to and from digital processing and control module 152 via a signal path 109. The control parameters are, in turn, routed to and from analog effects module 136 via a signal path 154.

The output from CD-ROM drive 108 is routed to a digital-to-analog converter 158 via a signal path 156 from digital processing and control module 152. The analog output of digital-to-analog converter 158 is then routed to stereo mixer 140 via a signal path 160. Stereo mixer 140 is an analog mixing circuit which mixes the stereo signals from both analog effects module 136 and digital-to-analog converter 158, and provides the mixed stereo outputs on signal paths 103 and 105.

Figure 3:
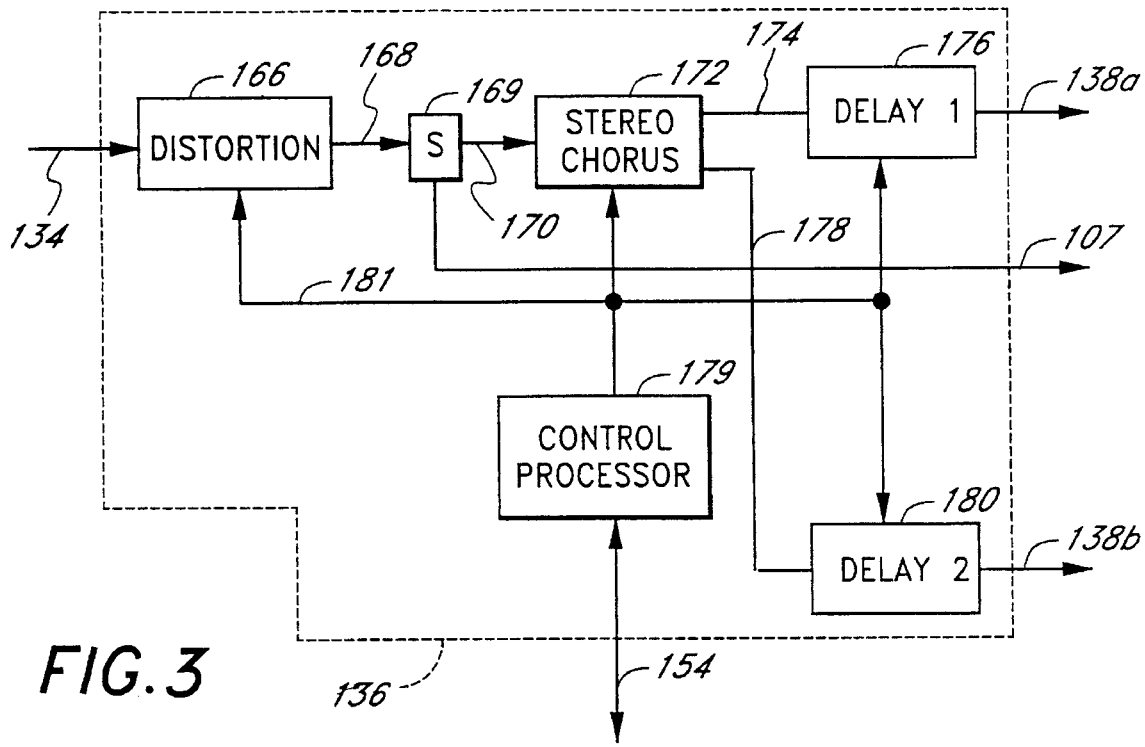
FIG. 3 is a more detailed functional block diagram of a musical effects apparatus showing a particular configuration of musical effects devices in accordance with the present invention.

Referring now to FIG. 3, an exemplary configuration of musical effects devices comprising analog effects module 136 is now discussed. The exemplary configuration of FIG. 3 is used to emulate to musical tone of a particular musical style and artist, and consists of a distortion device 166, a stereo chorus device 172, delay devices 176 and 180, and a control processor 179. Note that there are many other possible configurations of musical effects devices, depending on the specific musical tone desired. In the exemplary configuration shown, the input signal to analog effects module 136 is routed to distortion device 166 via a signal path 134, with the output of distortion device 166 routed to a signal splitter 169 via a signal path 168. The two outputs of signal splitter 169 are then routed respectively to stereo chorus device 172 via a signal path 170, and as a direct signal output via a signal path 107. The two stereo outputs of stereo chorus device 172 are routed, respectively, to delay device 176 via a signal path 174 and to delay device 180 via signal path 178. In the preferred embodiment, the delay time of delay device 176 is set at 230 milliseconds, while the delay time or delay device 180 is set at 460 milliseconds. The respective outputs of delay devices 176 and 180 are provided as stereo signal outputs via signal paths 138a and 138b. the three outputs of the exemplary configuration provide a musical tone that is "open; i.e., having spatial and temporal depth.

Continuing with FIG. 3, control processor 179 is connected to distortion device 176, stereo chorus device 172, and delay devices 176 and 180 via an address/data bus 181. More particularly, the control parameters are provided to control processor 179 from digital signal processing and control module 152 via a signal path 154, and are distributed to the appropriate device or devices via address/data bus 181.

Figure 4:
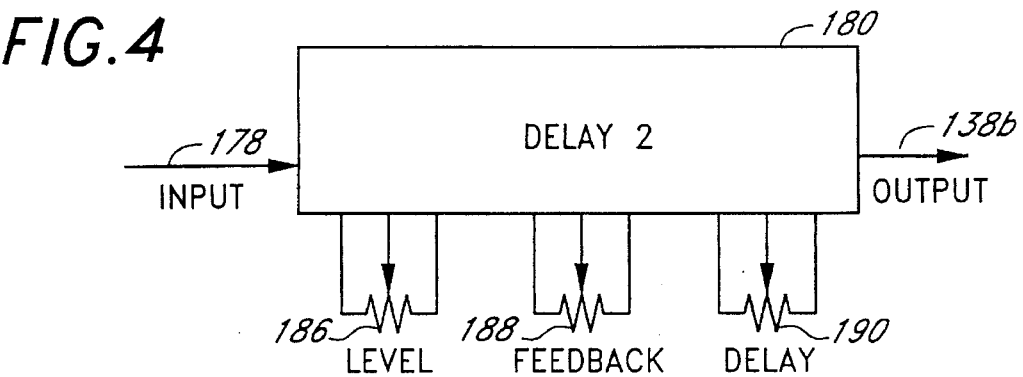
FIG. 4 shows a prior art delay device in which manually controlled potentiometers are used to control the operation of the device.

Continuing with FIG. 4, a typical prior art delay device 180 which uses analog potentiometers for manual control is shown. More particularly, delay device 180 includes an input signal path 178, an output signal path 138b, and control potentiometers 186, 188 and 190. In the example shown, potentiometer 186 controls the overall level of the musical effect, potentiometer 188 controls the amount of feedback of the delay, and potentiometer 190 controls the amount of delay time in milliseconds. Each of potentiometers 186 through 190 is manually adjusted to provide control of delay device 180.

Figure 5:
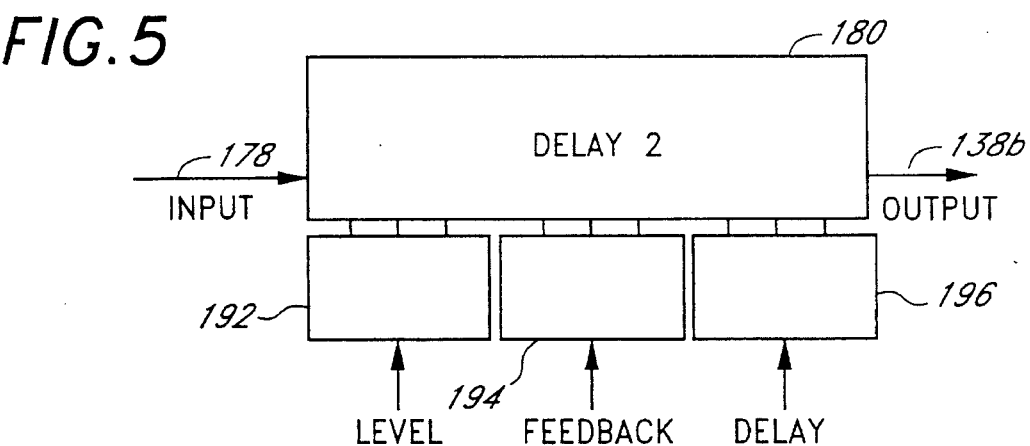
FIG. 5 shows a delay device of the present invention, in which the manually controlled potentiometers have been replaced by digitally programmable resistors.

Referring to FIG. 5, delay device 180 having a similar delay function is again shown, but in which potentiometers 186 through 190 have been replaced by programmable resistor networks 192, 194 and 196. Programmable resistor networks 192 through 196 are programmed by control processor 179 (FIG. 3) through address/data bus 181. More particularly, programmable resistor networks 192 through 196 allow preset resistance values to be programmed into each of the respective programmable resistors using control parameters provided to control processor 179 by computer system 102. the control parameters are selected to generate the preset resistance values needed to control the level, feedback, and delay time of delay device 180 in an automated fashion. Similar control parameters and preset resistance values are used to control the other musical effects devices comprising analog effects module 136.

Figure 6:
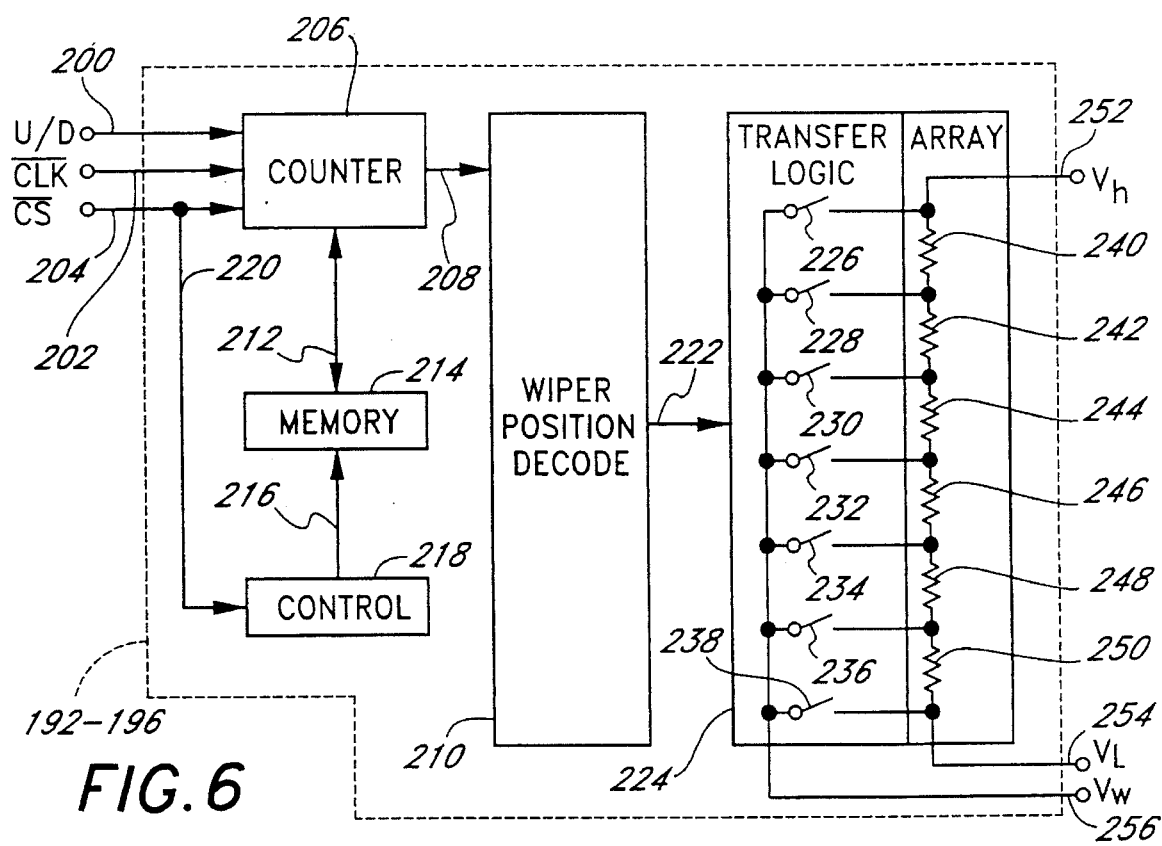
FIG. 6 is a more detailed functional block diagram of a programmable resistor for use with the present invention.

Referring now to FIG. 6, a functional block diagram of an exemplary programmable resistor network 192 is shown.

Programmable resistor network 192 includes a counter 206, a memory 214, a control module 218, a wiper positioning and decoding module 210, and a transfer logic and switching array 224. An up/down signal path 200 connected to counter 206 determines the direction of count, while a clock signal 202 increments counter 206 by one count each time a clock signal is received. A chip select signal 204 activates both counter 206 and control module 218. The output of counter 206 is routed to wiper position and decode module 210 via a signal path 208. In turn, the output of wiper position and decode module 210 is routed to transfer logic and resistance array module 224 via a signal path 222.

Programmable resistor 192 operates as follows. The device is selected via signal path 204 and the up or down count is selected via signal path 200. Clock signals are received via signal path 202 and counter 206 is incremented or decremented until a predetermined value is reached. When the predetermined value is reached, a change in logic level on signal path 204 signals control module 218 to transfer the value of the count via a signal path 212 to memory 214 for storage. Simultaneously, wiper position and decode module 210 positions its wiper which closes the appropriate combination of switches 226 through 238. the closed switches provide connections between the appropriate combination of resistors 240 through 250, thus providing a desired resistance value across signal paths 252 and 254.

The storage and recall of the control parameters will now be discussed with reference to FIGS. 7 through 12.

Figure 7:
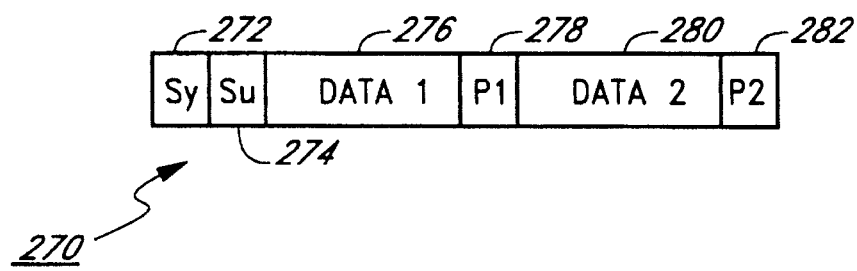
FIG. 7 illustrates the data format of a single frame of audio data stored on a conventional audio CD or CD-ROM.
Figure 8:
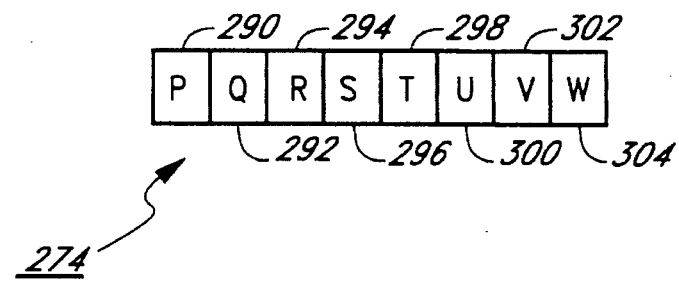
FIG. 8 illustrates the eight-bit subcode field of the data frame of FIG. 7.

Referring to FIG. 7, an exemplary data frame 270 for a conventional audio CD or CD-ROM is shown. Data frame 270 includes a synchronization field 272, a subcode field 274, data fields 276 and 280, and data parity fields 278 and 282. The number of bits comprising data frame 270 is two hundred ninety-one bits. Continuing with FIG. 8, the eight bits labeled P through W which comprise subcode field 274 are shown in greater detail. Note that in the standard audio CD or CD-ROM formats only bits P and Q are specified for use, leaving bits R through W available for user-defined or application specific functions. In the present invention, bits R through W of subcode field 274 are used to store the control parameters for programmable resistor networks 192–196.

Figure 9:
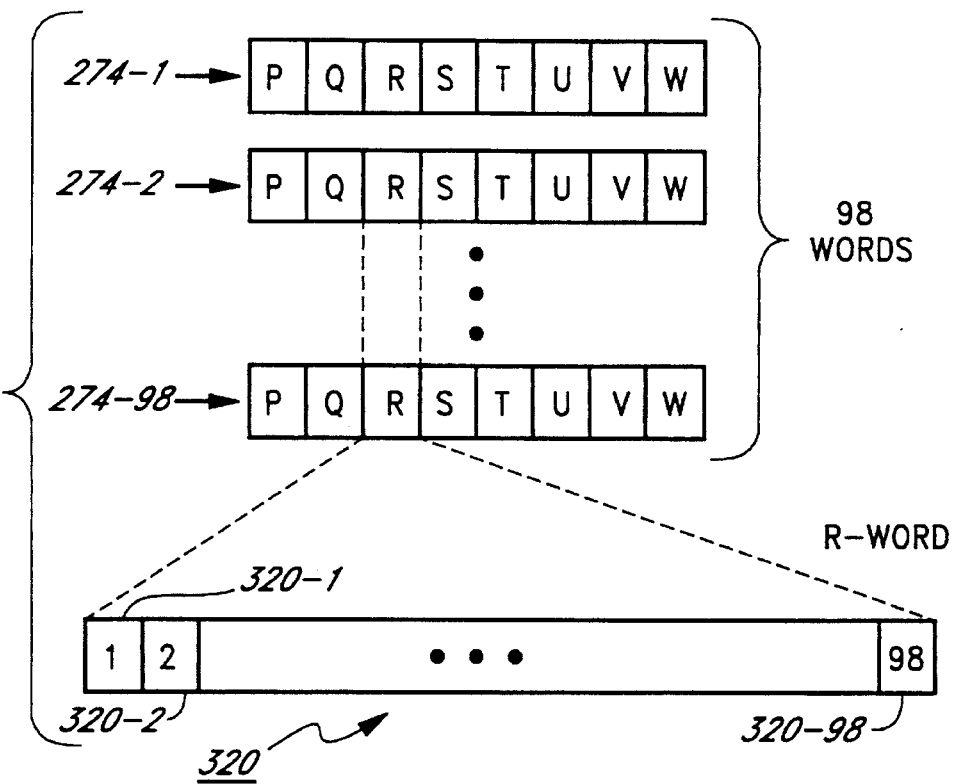
FIG. 9 illustrates the formation of a ninety-eight-bit data word from ninety-eight consecutive CD-ROM data frames.

More particularly, with reference to FIG. 9, the subcode fields 274-1 through 274-98 of ninety-eight CD-ROM data frames may be combined to form a ninety-eight-bit R-word 320. Similarly, ninety-eight-bit words S through W may be formed using the same ninety-eight CD-ROM data frames. Thus, within every ninety-eight CD-ROM data frames there are potentially six ninety-eight bit words available in which to store the control parameters for programmable resistor networks 192–196. Further, there are millions of data frames contained in a single CD-ROM. Indeed, a typical CD-ROM contains about 24 megabytes of unused storage space bits R through W of subcode field 274.

Figure 10:
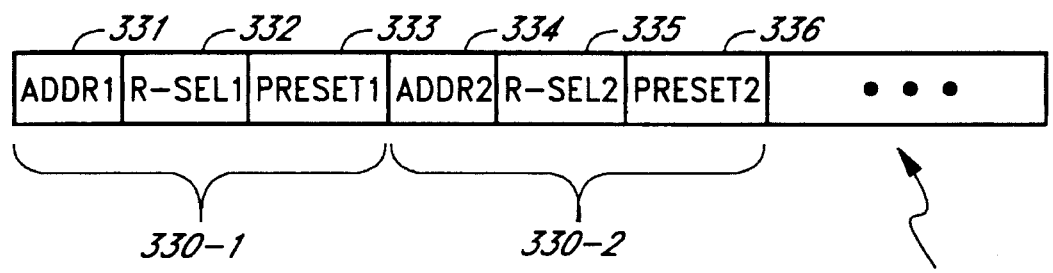
FIG. 10 illustrates the parsing of bits from the ninety-eight-bit data word of FIG. 9 to form plural control parameters.

As shown now in FIG. 10, ninety-eight bit R-word 320 may be parsed into control parameter fields 330-1, 330-2 and so on, each comprising an address field 331, 334, an R-select field 332, 335, a preset field 333, 336, and so on, to form parsed R-word 330. The exemplary parsing of R-word 320 may be used to form the control parameters for controlling programmable resistor networks 192–196.

Referring to FIG. 11, a functional block diagram 350 of the control logic for controlling programmable resistor networks 192–196 is shown. As shown in FIG. 11, parsed ninety-eight bit R-word 330 is transferred from CD-ROM drive 108 to an R-word buffer 354 via a signal path 352. The stored R-word 330 is then transferred to an R-word decoding and control module 358 via a signal path 356. The R-word 330 received from R-word buffer 354 is decoded by R-word decoding and control module 358, and the decoded control parameters (see FIG. 10) are sequentially transferred to a parameter buffer 370 via a signal path 364. Similarly, the decoded address values are transferred to an address logic module 372 via signal paths 366 and 368, where they are used to address the control parameters stored in parameter buffer 370. The R-select values are similarly transferred to a resistor select logic module 390 via signal path 366, where they are each used to select one of programmable resistor networks 192–196. Each control parameter is individually transferred from parameter buffer 370 to a preset counter 378 via a signal path 376 and a clock 380 generates a clock signal which is used to clock preset counter 378 via a signal path 382.

Continuing with FIG. 11, a resistor select logic module 390 is used to select a clock multiplexer 388 and an enable multiplexer 394 via a signal path 392. The outputs of the enable multiplexer 394 are used to select one of programmable resistor networks 192–196 for programming via signal paths 396, 398 or 400. Similarly, clock multiplexer 388 is used to route the clock signal from signal path 384 to the selected programmable resistor network via signal paths 402, 404, or 406.

Figure 12:
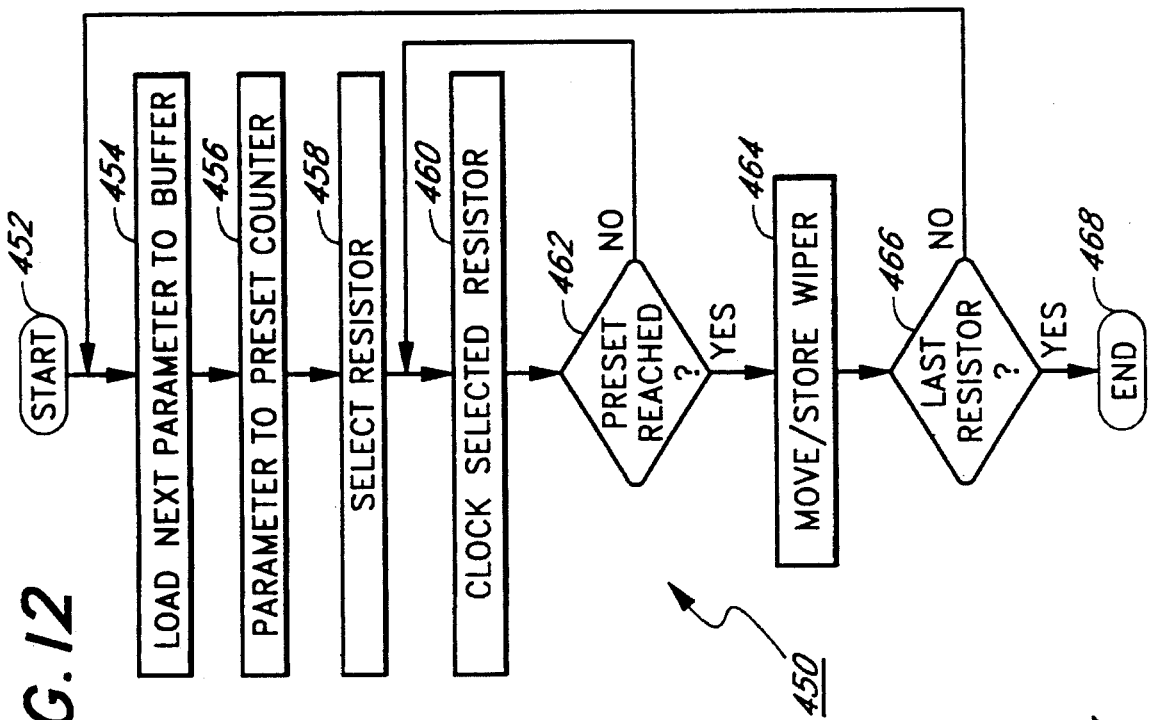
FIG. 12 shows a flow chart which further illustrates the control of the programmable resistors.

Referring to FIG. 12, a flow chart 450 which details the processing and control steps of functional block diagram 350 is shown. Processing begins at step 452 and continues at step 454 where a next control parameter is loaded into parameter buffer 370 from decoding and control module 358. Processing continues at step 456 where the control parameter in parameter buffer 370 is transferred to preset counter 378, and at step 458 where one of programmable resistor networks 192–196 is selected by resistor select logic module 390. Processing continues at step 460 where the selected resistor network is clocked until the value of the control parameter is preset counter 378 is reached. When the preset value is reached, processing continues at step 464 where the wiper of the selected programmable resistor network is properly positioned to select the corresponding combinations or resistors. Processing continues at step 466 where a determination is made as to whether the last programmable resistor network has been programmed. If not, processing continues at step 454, otherwise processing ends at step 468.

Figure 13:
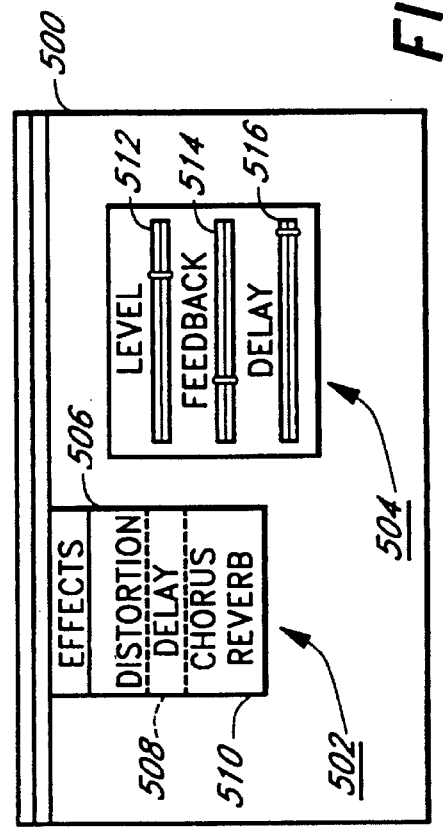
FIG. 13 shows an exemplary screen and menus for providing manual control over the programmable resistors.

Referring to FIG. 13, a software control menu 500 for providing additional manual control of programmable resistor networks 192–196 is shown. Control menu 500 includes a submenu 502 which, in turn, comprises a distortion control icon 506, a delay control icon 508, and a chorus control icon 510. Control menu 500 further includes a parameter adjustment menu 504 which includes adjustable sliders 512, 514 and 516. To use software control menu 500, the particular musical effect to be manually adjusted is selected. In the example shown in FIG. 13, delay control icon 508 has been selected. This selection opens parameter adjustment menu 504 with the appropriate sliders to allow manual adjustment of the parameters for the selected musical effect. These sliders may then be adjusted manually, resulting in a corresponding change in the control parameters which are stored in parameter buffer 370, in turn, resulting in a change in the selected resistor network value. Note that, in the preferred embodiment, the control parameters may be manually adjusted from baseline stored values. This eliminates trial-and-error searching for the parameter values needed to achieve a particular musical tone.

Thus, the present invention provides a method and apparatus for controlling the musical tone of a musical instrument in an automated fashion. Using the present invention, a user can match the tone of a musical instrument being played with the recorded tone of a like instrument without trial-and-error manual adjustment.

Although a particular embodiment of the invention has been described in detail for purposes of illustration, various modification may be made without departing from the spirit and scope of the invention. Accordingly, the invention is not to be limited, except as by the appended claims.

We claim:

1. A musical effects apparatus for conditioning a first musical tone of a musical instrument being played to match a second musical tone, said second musical tone being pre-recorded from an exemplary musical instrument which corresponds to said musical instrument being played, said musical effects apparatus comprising:

a distortion device for adding distortion to an audio signal corresponding to said first musical tone to form a distorted musical tone signal;

a signal splitter coupled to said distortion device for splitting said distorted musical tone signal into an intermediate distorted musical tone signal and a distorted output signal;

a stereo chorus device coupled to said signal splitter for receiving said intermediate distorted musical tone signal and generating first and second stereo musical tone signals from said intermediate distorted musical tone signal;

a first delay device coupled to said stereo chorus device for delaying said first stereo musical tone signal by a first predetermined amount to form a first delayed output signal;

a second delay device coupled to said stereo chorus device for delaying said second stereo musical tone signal by a second predetermined amount to form a second delayed output signal; and a control processor for generating one or more control signals for controlling each of said distortion, stereo chorus, first delay and second delay devices, said control processor including an address/data bus for transferring said one or more control signals to each of said distortion, stereo chorus, first delay and second delay devices.

2. The musical effects apparatus of claim 1, wherein each of said distortion, stereo chorus, first delay and second delay devices comprises a digitally programmable control network.

3. The musical effects apparatus of claim 2, further comprising a storage device coupled to said control processor, for storing music data and tone control data corresponding to said second musical tone.

4. The musical effects apparatus of claim 3, wherein said storage device comprises a compact disk having a plurality of data fields and subcode fields, and wherein said music data is stored in said data fields and said tone control data is stored in said subcode fields.

5. The musical effects apparatus of claim 4, wherein said control processor further comprises means for generating one or more digital control parameters from said tone control data, said digital control parameters for controlling said distortion, stereo chorus, first delay and second delay devices according to said tone control data.

6. A musical effects apparatus for conditioning a musical input signal, comprising:

a distortion device for adding distortion to said musical input signal, said distortion device having an input for receiving said musical input signal;

a signal splitter coupled to said distortion device for receiving said musical input signal from said distortion device and directing said musical input signal along a first signal path out of said musical effects apparatus, and along a second signal path;

a stereo chorus device coupled to said second signal path for receiving said musical input signal from said signal splitter and generating two stereo output signals;

a plurality of delay devices coupled to said stereo chorus device for receiving said two stereo output signals from said stereo chorus device, each of said plurality of delay devices for delaying said stereo output signals by predetermined amounts; and control means for automatically conditioning said musical input signal by said distortion, stereo chorus and delay devices.

7. The musical effects apparatus of claim 6, wherein said control means includes a plurality of programmable resistor networks associated with each of said distortion, stereo chorus and delay devices.

8. The musical effects apparatus of claim 7, wherein said control means includes a control processor which provides control input to said programmable resistor networks through a common data bus.

9. The musical effects apparatus of claim 8, wherein said control means includes a digital signal processing and control device linked to a host computer, and means for comparing said musical input signal with a desired output audio signal.

10. The musical effects apparatus of claim 7, wherein said programmable resistor networks each include a plurality of resistors associated with a digitally actuated switching array, and means for selecting an appropriate combination of said plurality of resistors in accordance with input control signals.

11. The musical effects apparatus of claim 10, wherein said control means includes a control processor which provides said input control signals to said programmable resistor networks, said control processor input control signals comprising an up/down signal, a clock signal, and a chip select signal.

12. The musical effects apparatus of claim 6, wherein said control means includes a control processor for generating one or more control signals for controlling each of said distortion, stereo chorus and delay devices, and means for comparing said musical input signal with a desired output audio signal.

13. The musical effects apparatus of claim 12, further comprising a storage device coupled to said control processor, said storage device for storing music data and tone control data corresponding to said desired output audio signal, said storage device comprising a compact disk having a plurality of data fields and subcode fields, wherein said music data is stored in said data fields and said tone control data is stored in said subcode fields.

14. The musical effects apparatus of claim 13, wherein said control processor further comprises means for generating one or more digital control parameters from said tone control data, said digital control parameters controlling said distortion, stereo chorus and delay devices according to said tone control data.

15. An apparatus for conditioning the musical tone of a musical instrument being played, comprising:

means for storing music data and tone control data for a musical composition of an exemplary musical instrument in machine readable form, said exemplary musical instrument corresponding to said musical instrument being played, wherein said data storing means comprising a compact disk having a data field and a subcode field, and wherein said music data is stored in said compact disk data field, and wherein said tone control data is stored in said compact disk subcode field;

means for conditioning said musical tone of said musical instrument being played, including means for mixing said musical tone of said musical instrument being played with said music data of said exemplary musical instrument; and means for controlling said conditioning means using said tone control data so that said musical tone of said musical instrument being played matches said music data of said exemplary musical instrument.

16. An apparatus for conditioning the musical tone of a musical instrument being played, comprising:

means for storing music data and tone control data for a musical composition of an exemplary musical instrument in machine readable form, said exemplary musical instrument corresponding to said musical instrument being played;

means for conditioning said musical tone of said musical instrument being played, including means forming said musical tone of said musical instrument being played with said music data of said exemplary musical instrument; and means for controlling said conditioning means using said tone control data so that said musical tone of said musical instrument being played matches said music data of said exemplary musical instrument, wherein said conditioning means further comprises one or more musical effects devices for conditioning said musical tone of said musical instrument being played in a predetermined manner.

17. The apparatus of claim 16, wherein said one or more musical effects devices comprises a distortion device for adding distortion to said musical tone of said musical instrument being played.

18. The apparatus of claim 16, wherein said one or more musical effects devices comprises a stereo chorus device for generating stereo musical tones from said musical tone of said musical instrument being played.

19. The apparatus of claim 16, wherein said one or more musical effects devices comprises one or more delay devices for delaying said musical tone of said musical instrument being played by a predetermined amount.

20. The apparatus of claim 16, wherein said controlling means comprises a digital signal processing and control device for generating one or more control signals from said tone control data, wherein said control signals directly control said one or more musical effects devices.

21. The apparatus of claim 16, wherein said one or more musical effects devices are analog musical effects devices which further comprise one or more digitally programmable control networks, wherein said digitally programmable control networks provide digital control of said analog musical effects devices.

22. The apparatus of claim 21, wherein one or more of said one or more digitally programmable control networks comprises a programmable resistor network.

23. The apparatus of claim 21, wherein said controlling means comprises a control processor and an address/data bus, wherein said control processor generates one or more digital control parameters from said tone control data, and said address/data bus transfers each of said digital control parameters to said one or more digitally programmable control networks.

24. A process for controlling the tone of a selected musical instrument, said process comprising the steps of:

storing a musical composition of an exemplary musical instrument in machine readable form, said exemplary musical instrument corresponding to said selected musical instrument, wherein said musical composition includes music data and tone control data, and said storing step comprises the steps of storing said music data within a compact disk data field and storing said tone control data within a compact disk subcode field;

inputting a first audio signal from said selected musical instrument into a musical effects device;

generating a second audio signal from said stored musical composition, and inputting said second audio signal into said musical effects device; and conditioning said first audio signal from said selected musical instrument using said musical effects device so that its tone matches the tone of said second audio signal of said stored musical composition.

25. The process of claim 24, wherein said conditioning step comprises the step of generating one or more control signals from said tone control data, wherein said control signals control said musical effects device.

26. The process of claim 25, wherein said musical effects device comprises an analog musical effects device, and wherein said conditioning step further comprises the step of providing digital control of said analog musical effects device.

27. The process of claim 26, wherein said conditioning step further comprises the step of adding distortion to said first audio signal.

28. The process of claim 26, wherein said conditioning step further comprises the step of generating stereo musical tones from said first audio signal.

29. The process of claim 26, wherein said conditioning step further comprises the step of delaying said first audio signal by a predetermined amount.

30. The process of claim 25, wherein said step of storing tone control data includes the step of storing one or more control parameters for controlling said musical effects device in said subcode field of said compact disk, and wherein said generating and conditioning steps include the steps of reading said one or more stored control parameters from said subcode field of said compact disk, creating an electronic signal in accordance with said one or more control parameters, and transferring said electronic signal to said musical effects device to effect desired control thereof.

31. The process of claim 30, further comprising the step of utilizing one or more unused bits of said subcode field for storing said one or more control parameters.

32. The process of claim 31, further comprising the step of forming a ninety-eight-bit word from ninety-eight consecutive subcode fields, said ninety-eight-bit word containing said one or more control parameters.

33. The processes of claim 32, further comprising the step of parsing said ninety-eight-bit word into distinct control parameter storage fields.

34. The process of claim 30, wherein said musical effects device further comprises a programmable resistor network, said programmable resistor network having a plurality of resistors associated with a digitally actuated switching array, and said process further comprising the step of creating signals from said stored control parameters to control said digitally actuated switching array to select one or more of said resistors.

* * * * *